United States Patent
Lv et al.

(10) Patent No.: US 11,262,120 B2
(45) Date of Patent: Mar. 1, 2022

(54) REFRIGERATION APPLIANCE AND DOOR BODY THEREOF

(71) Applicant: BSH HAUSGERAETE GMBH, Munich (DE)

(72) Inventors: Ping Lv, Nanjing (CN); Xun Wang, Nanjing (CN); Nanwei Zhang, Nanjing (CN)

(73) Assignee: BSH Hausgeraete GmbH, Munich (DE)

(*) Notice: Subject to any disclaimer, the term of this patent is extended or adjusted under 35 U.S.C. 154(b) by 0 days.

(21) Appl. No.: 17/036,179

(22) Filed: Sep. 29, 2020

(65) Prior Publication Data

US 2021/0095914 A1  Apr. 1, 2021

(30) Foreign Application Priority Data

Sep. 29, 2019 (CN) .......................... 201910930797.8

(51) Int. Cl.
*F25D 23/02* (2006.01)
*F25D 23/08* (2006.01)

(52) U.S. Cl.
CPC ......... *F25D 23/028* (2013.01); *F25D 23/087* (2013.01); *F25D 2201/122* (2013.01)

(58) Field of Classification Search
CPC ...... F25D 23/02; F25D 23/026; F25D 23/028; F25D 23/087

USPC .............................. 312/401, 405, 116, 138.1
See application file for complete search history.

(56) References Cited

U.S. PATENT DOCUMENTS

| | | | |
|---|---|---|---|
| 10,302,348 B2 * | 5/2019 | Lv | F25D 23/02 |
| 10,801,772 B2 * | 10/2020 | Lv | A47F 3/0434 |
| 2002/0078654 A1 * | 6/2002 | Richardson | A47F 3/0434 52/656.9 |
| 2008/0093957 A1 * | 4/2008 | Neumann | A47F 3/0434 312/116 |
| 2009/0007587 A1 * | 1/2009 | Lanzl | A47F 3/0434 62/449 |
| 2013/0285517 A1 * | 10/2013 | Wach | A47F 3/0434 312/114 |
| 2017/0176090 A1 * | 6/2017 | Allard | B32B 15/043 |
| 2018/0164023 A1 * | 6/2018 | Lv | F25D 23/02 |
| 2018/0164025 A1 * | 6/2018 | Lv | F25D 23/02 |

* cited by examiner

*Primary Examiner* — James O Hansen
(74) *Attorney, Agent, or Firm* — Laurence A. Greenberg; Werner H. Stemer; Ralph E. Locher

(57) ABSTRACT

A door body for a refrigeration appliance includes a main part and a frame surrounding the main part. The frame includes a housing with a cavity. The cavity is filled with an insulation material in contact with the main part. A door seal is mounted on a rear side of the housing and a seal strip is located between the housing and the main part. A refrigeration appliance including the door body is also provided.

11 Claims, 3 Drawing Sheets

REFRIGERATION APPLIANCE AND DOOR BODY THEREOF

CROSS-REFERENCE TO RELATED APPLICATION

This application claims the priority, under 35 U.S.C. § 119, of Chinese Patent Application CN 201910930797.8, filed Sep. 29, 2019; the prior application is herewith incorporated by reference in its entirety.

BACKGROUND OF THE INVENTION

Field of the Invention

The present invention relates to the field of refrigeration technologies and, in particular, to a refrigeration appliance and a door body thereof.

The poor sealing performance of door bodies of existing refrigeration appliances such as some refrigerators may affect the performance of the corresponding refrigeration appliances.

BRIEF SUMMARY OF THE INVENTION

It is accordingly an object of the invention to provide an improved refrigeration appliance and a door body thereof, which overcome the hereinafore-mentioned disadvantages of the heretofore-known devices of this general type.

With the foregoing and other objects in view there is provided, in accordance with the invention, a door body for a refrigeration appliance, including a main part, a frame surrounding the main part, the frame including a housing with a cavity, the cavity being filled with an insulation material in contact with the main part, a door seal mounted on a rear side of the housing, and a seal strip located between the housing and the main part.

In some embodiments, the seal strip is located on an inner side of the door seal.

In some embodiments, the seal strip is located on a front side of the door seal.

In some embodiments, the seal strip includes a polyurethane adhesive.

In some embodiments, the housing includes a mounting part mounted with the door seal, the mounting part protruding toward the main part, and the cavity including a first cavity outside the mounting part and a second cavity inside the mounting part.

In some embodiments, the cavity includes a slit located between the mounting part and the main part and placing the first cavity in communication with the second cavity, a size of the slit in a thickness direction of the door body is smaller than the sizes of the first cavity and the second cavity, and the slit includes the insulation material.

In some embodiments, the housing includes an inner wall, the seal strip fills-in between the inner wall and the main part, and the second cavity is located among or between the inner wall, the main part and the mounting part.

In some embodiments, the second cavity accommodates the insulation material.

In some embodiments, the second cavity includes a gas insulation layer in contact with the insulation material.

In some embodiments, the insulation material includes an insulation material made of a foaming material.

In some embodiments, the housing includes a rear frame part, a lateral frame part connected to the rear frame part, and an inner wall bent forward from an inner side of the rear frame part to extend toward the main part, and the seal strip is located between the inner wall and the main part.

In some embodiments, the main part includes at least two layers of separated glass plates.

With the objects of the invention in view, there is concomitantly provided a refrigeration appliance, including the foregoing door body.

Other features which are considered as characteristic for the invention are set forth in the appended claims.

Although the invention is illustrated and described herein as embodied in a refrigeration appliance and a door body thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
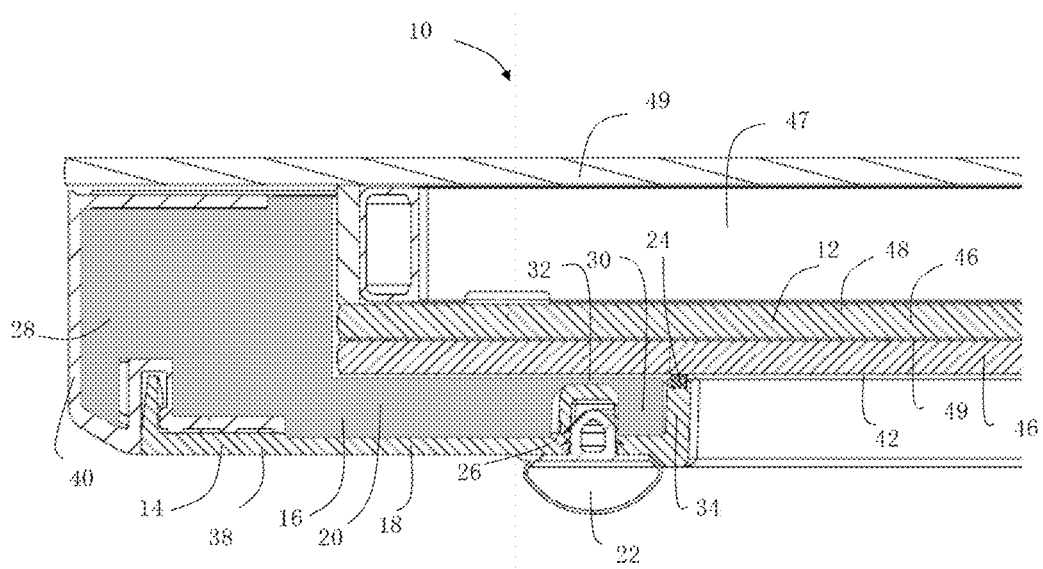
FIG. 1 is a fragmentary, diagrammatic, sectional view of a door body according to one aspect of the embodiments of the present invention.
Figure 2:
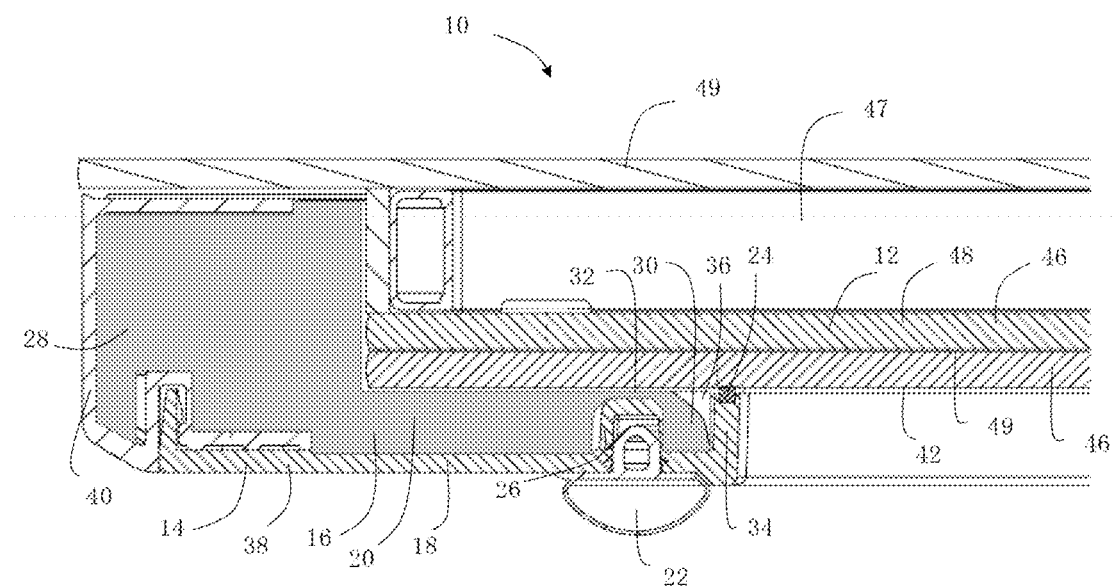
FIG. 2 is a fragmentary, sectional view of a door body according to another embodiment of the present invention.
Figure 3:
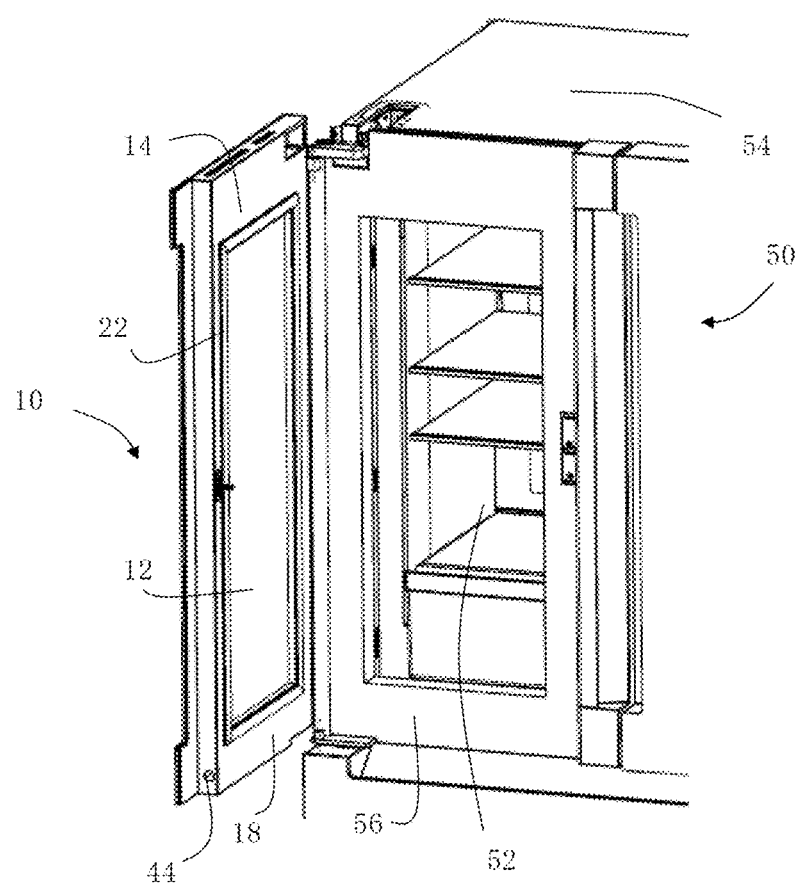
FIG. 3 is a fragmentary, perspective view of a refrigeration appliance including a door body according to another aspect of the embodiments of the present invention.

Referring now in detail to FIGS. 1 to 3 of the drawings as a whole, there is seen one aspect of the embodiments of the present invention which relates to a door body 10 for a refrigeration appliance 50. The door body 10 includes a main part 12, a frame 14 surrounding the main part 12, the frame 14 including a housing 18 with a cavity 16, the cavity 16 being filled with an insulation material 20 in contact with the main part 12, a door seal 22 mounted on a rear side of the housing 18, and a seal strip 24 located between the housing 18 and the main part 12.

In this way, the sealing performance of the door body 10 is improved in order to avoid problems, such as a small water mist forming on an inner surface 42 of the main part 12 leaking between the housing 18 and the main part 12 when the door body 10 of the refrigeration appliance 50 is opened, forming condensation of the door seal, and resulting in a poor thermal insulation effect of the door body 10.

In some embodiments, the seal strip 24 is located on an inner side of the door seal 22. The "inner side" and similar terms mentioned in this application may be relative to the position of the main part 12 or the length or width direction of the main part 12. For example, an inner side may be a part close to the center of the main part 12, and an outer side may be a part far away from the center of the main part 12. That is, the seal strip 24 may be closer to the center of the main part 12 than the door seal 22. In this way, the problems, such as the small water mist formed on the inner surface 42 of the main part 12 leaking between the housing 18 and the main part 12 when the door body 10 of the refrigeration appliance 50 is opened, forming condensation of the door seal, and resulting in the poor thermal insulation effect of the door body 10, may be avoided.

In some embodiments, the seal strip 24 is located on a front side of the door seal 22. In this way, the problems, such as the small water mist formed on the inner surface 42 of the main part 12 leaking between the housing 18 and the main part 12 when the door body 10 of the refrigeration appliance 50 is opened, forming condensation of the door seal, and resulting in the poor thermal insulation effect of the door body 10, may be avoided.

In some embodiments, the seal strip 24 includes a polyurethane adhesive. In this way, the seal strip 24 may be fully pressed when assembled with the main part 12 to avoid the problems, such as the small water mist formed on the inner surface 42 of the main part 12 leaking between the housing 18 and the main part 12 when the door body 10 of the refrigeration appliance 50 is opened, forming condensation of the door seal, and resulting in the poor thermal insulation effect of the door body 10.

In some embodiments, the housing 18 includes a mounting part 26 mounted with the door seal 22, in which the mounting part 26 protrudes toward the main part 12, and the cavity 16 includes a first cavity 28 outside the mounting part 26 and a second cavity 30 inside the mounting part 26. The first cavity 28, the second cavity 30 and the insulation material 20 therein contribute to thermal insulation of the frame 14 of the door body 10.

In some embodiments, the cavity 16 includes a slit 32 located between the mounting part 26 and the main part 12 and placing the first cavity 28 in communication with the second cavity 30. A size of the slit 32 in a thickness direction of the door body 10 is smaller than the sizes of the first cavity 28 and the second cavity 30, and the slit 32 includes the insulation material 20. In this way, the door body 10 may have better thermal insulation performance in case the thickness is minimized.

In some embodiments, the housing 18 includes an inner wall 34. The seal strip 24 fills-in between the inner wall and the main part 12, and the second cavity 30 is located among or along the inner wall 34, the main part 12 and the mounting part 26. The seal strip 24 contributes to avoidance of an occurrence in which the small water mist formed on the inner surface 42 of the main part 12 leaks into the second cavity 30 when the door body 10 is opened for use, to affect the sealing effect of the second cavity 30.

In some embodiments, as shown in FIG. 1, the second cavity 30 accommodates the insulation material 20. The second cavity 30 and the insulation material 20 contribute to thermal insulation of the frame 14 of the door body 10.

In some embodiments, as shown in FIG. 2, the second cavity 30 includes a gas insulation layer 36 in contact with the insulation material 20. The gas insulation layer 36 and the insulation material 20 contribute to thermal insulation of the frame 14 of the door body 10. The gas insulation layer 36 may include air.

In some embodiments, the insulation material 20 includes an insulation material made of a foaming material, such as polyurethane. Referring to FIG. 3, the housing 18 includes a feeding hole 44, so that a foaming material can be injected into the cavity 16 through the feeding hole 44. The feeding hole 44 may be in communication with the first cavity 28 (FIG. 1 and FIG. 2). In the process of injecting the foaming material into the cavity 16 from the feeding hole 44, a size of the slit 32 in the thickness direction of the door body 10 is smaller than those of the first cavity 28 and the second cavity 30. After the foaming material enters the first cavity 28 from the feeding hole 44, it is difficult for the foaming material to enter the second cavity 30 through the slit 32. The foaming material may fully fill the second cavity 30 as shown in FIG. 1, or partially fill the second cavity 30 as shown in FIG. 2, so that the foaming material and the gas insulation layer 36 coexist in the second cavity 30.

In some embodiments, the housing 18 includes a rear frame part 38 and a lateral frame part 40 connected to the rear frame part 38, the inner wall 34 is bent forward from an inner side of the rear frame part 38 to extend toward the main part 12, and the seal strip 24 is located between the inner wall 34 and the main part 12. The rear frame part 38, lateral frame part 40, and the inner wall 34 support the main part 12 while ensuring the thermal insulation performance of the door body 10.

In some embodiments, the main part 12 includes at least two layers of separated glass plates 46. Adjacent glass plates 46 may form a glass module 48. The space between the glass plates 46 of the glass module 48 may contain a vacuum or may include air or another thermal insulation gas. The glass module 48 having a space between the glass plates 46 containing a vacuum, may be referred to as a vacuum glass module. The glass module 48 may be approximately in the shape of a rectangle having edges surrounded by the frame 14.

A portion of the glass module 48 not covered by the frame 14 is available for a user to observe the interior of the refrigeration appliance 50 without opening the door body 10.

The main part 12 may include a front glass plate 49 located in front of the vacuum glass module 48. The front glass plate 49 may be configured to protect the glass module 48 to prevent the glass module 48 from being directly exposed to the region that can be contacted by a user, to prevent the user from being injured if it breaks. The front glass plate 49 may also serve as a decorative plate to beautify the appearance of the door body 10. An interval between the front glass plate 49 and the glass module 48 may form a thermal insulation space 47. The interval between the front glass plate 49 and the glass module 48 may be greater than an interval between the glass plates 46. The front glass plate 49 may block front parts of the glass module 48 and the frame 14.

Another aspect of the embodiments of the present invention relates to a refrigeration appliance 50, including the foregoing door body 10. The refrigeration appliance 50 may be a refrigerator, but is not limited to a refrigerator, and may alternatively be another appliance with a refrigerating function, such as a wine cooler.

As shown in FIG. 3, the refrigeration appliance 50 may include a box body 54 in which a storage compartment 52 is disposed. The door body 10 may be configured to open or close the storage compartment 52. The refrigeration appliance 50 may include a second door 56 between the door body 10 and the box body 54. The door seal 22 surrounding the frame 14 may be configured to perform sealing between contact surfaces of the door body 10 and the door seal 22 when the door body 10 closes the storage compartment 52, so as to prevent the leakage of the cold air in the storage compartment 52 of the refrigeration appliance 50. The contact surfaces may be located on the box body (not shown) of the refrigeration appliance or the second door 56.

The terms "rear side," "front side" and similar terms mentioned in this application may be relative to the use state of the refrigeration appliance 50. For example, when the door body 10 is closed, a thickness direction thereof may be parallel to the front and rear direction, the part close to a user may be a front side, and the part close to the storage compartment 52 may be a rear side. If the seal strip 24 is located on a front side of the door seal 22, when the door body 10 is closed, compared with the door seal 22, the seal strip 24 may be closer to the main part 12, the front glass plate 49, and a user (not shown).

The various specific implementations described above and shown in the accompanying drawings are only used to illustrate the present invention, but are not the entirety of the present invention. Any variation made by a person of ordinary skill in the art to the present invention within the scope of the basic technical concept of the present invention shall fall within the protection scope of the present invention. For example, if the technical condition permits, the aspect, feature and structure in any of the above embodiments may be combined with the combination of single or multiple aspects, features and structures in any other embodiments to form a new embodiment.

The invention claimed is:

1. A door body for a refrigeration appliance, the door body comprising:
    a main part;
    a frame surrounding said main part, said frame including a housing with a rear side and a cavity;
    an insulation material filling said cavity and being in contact with said main part;
    a door seal mounted on said rear side of said housing;
    a seal strip located between said housing and said main part;
    said housing including a mounting part mounted with said door seal;
    said mounting part protruding toward said main part;
    said cavity including a first cavity disposed outside said mounting part and a second cavity disposed inside said mounting part;
    said cavity including a slit located between said mounting part and said main part, said slit placing said first cavity in communication with said second cavity;
    said slit being smaller in size in a thickness direction of the door body than said first cavity and said second cavity; and
    said slit including said insulation material.

2. The door body according to claim 1, wherein said seal strip is located on an inner side of said door seal.

3. The door body according to claim 1, wherein said seal strip is located on a front side of said door seal.

4. The door body according to claim 1, wherein said seal strip includes a polyurethane adhesive.

5. The door body according to claim 1, wherein:
    said housing includes an inner wall;
    said seal strip is filled-in between said inner wall and said main part; and
    said second cavity is located between said inner wall, said main part and said mounting part.

6. The door body according to claim 1, wherein said second cavity accommodates said insulation material.

7. The door body according to claim 1, wherein said second cavity includes a gas insulation layer in contact with said insulation material.

8. The door body according to claim 1, wherein said insulation material includes an insulation material made of a foaming material.

9. The door body according to claim 1, wherein:
    said housing includes a rear frame part, a lateral frame part connected to said rear frame part, and an inner wall bent forward from an inner side of said rear frame part to extend toward said main part; and
    said seal strip is located between said inner wall and said main part.

10. The door body according to claim 1, wherein said main part includes at least two layers of separated glass plates.

11. A refrigeration appliance, comprising the door body according to claim 1.

* * * * *